United States Patent Office 3,255,187
Patented June 7, 1966

---

3,255,187
3-(3-INDOLYL)-2H-1,4-BENZOXAZIN-2-ONES
Robert B. Moffett, Kalamazoo, Mich., assignor to The Upjohn Company, Kalamazoo, Mich., a corporation of Delaware
No Drawing. Filed Nov. 4, 1963, Ser. No. 321,366
3 Claims. (Cl. 260—244)

This invention relates to novel chemical compounds and to a process for preparing the same and is particularly directed to 3-(3-indolyl)-2H-1,4-benzoxazine-2-ones and the preparation thereof.

The novel compounds of the invention have the following structural formula

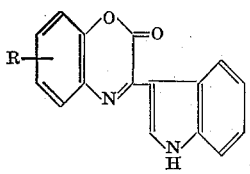

Formula I wherein R is a member selected from the group consisting of hydrogen, methyl and ethyl.

The novel compounds of the invention are prepared by condensing a lower-alkyl 3-indoleglyoxylate of the formula

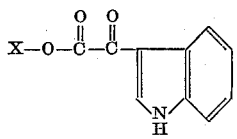

wherein X is lower-alkyl of from 1 to 8 carbon atoms, inclusive, with an o-aminophenol of the formula

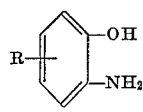

wherein R is a member selected from the group consisting of hydroegn, methyl and ethyl.

The condensation is accelerated by gentle heating (from room temperature, about 25° C., to about 180° C.) and advantageously is carried out in a non-oxidizing atmosphere, for example, nitrogen. The proportion of reactants can be varied over a wide range. Equimolar amounts are suitable though an excess of either reactant can be used if desired. An inert solvent, for example, dimethylformamide, toluene, ethanol, dioxane, and tetrahydrofuran, can be used if desired.

The compounds of Formula I have antiviral activity; antibacterial activity, e.g., can be used to inhibit the growth of B. subtilis; antifungal activity, e.g., can be used to inhibit the growth of Trichophyton rubrum. The compounds also inhibit body lipid deposition and can be used as anti-obesity agents in mammals or animals. Further, the compounds have body temperature lowering, sedative and tranquilizing activities and can be used to calm agitated mammals or animals, e.g., laboratory rats and mice.

The invention can be more fully understood by reference to the following examples, which are given by way of illustration and not of limitation. Parts and percentages are by weight unless otherwise specified.

*Example 1.—3-(3-indolyl)-2H-1,4-benzoxazin-2-one*

A solution of 21.7 gm. (0.1 mole) of ethyl 3-indoleglyoxylate and 10.9 gm. (0.1 mole) of o-aminophenol in 50 ml. of dimethylformamide was heated in an oil bath at 170° C. under nitrogen with stirring for 2 hours. The solution was diluted to 250 ml. with hot absolute ethanol and cooled to provide 15.6 gm. of yellow crystals. Recrystallization from 1 liter of absolute ethanol provided 3 - (3 - indolyl) - 2H - 1,4 - benzoxazin - 2- one having a melting point of 246.5–247° C. Some less pure product was obtained from the filtrate.

*Analysis.*—Calcd. for $C_{16}H_{10}N_2O_2$: C, 73.27; H, 3.84; N, 10.68. Found: C, 73.33; H, 3,94; N, 10.94.

*Example 2.—3-(3-indolyl)-6-methyl-2H-1,4-benzoxazin-2-one*

A mixture of 21.7 gm. (0.1 mole) of ethyl 3-indoleglyoxylate and 16.0 gm. (0.13 mole) of 2-amino-4-methylphenol was heated in an oil bath at 140–160° C. for 1.5 hours. The mixture was cooled and boiled with 100 ml. of absolute ethanol, cooled and the precipitate collected on a filter to provide 25.45 gm. of yellow-brown 3-(3-indolyl) - 6 - methyl-2H-1,4-benzoxazin-2-one having a melting point of 233–247° C. The solid was recrystallized from 200 ml. of 2-methoxyethanol, to provide 16.0 gm. (58% theory) of golden crystals of 3-(3-indolyl)-6-methyl-2H-1,4-benzoxazin-2-one having a melting point of 254–255.5° C.

*Analysis.*—Calcd. for $C_{17}H_{12}N_2O_2$: C, 73.90; H, 4.38; N, 10.14. Found: C, 73.82; H, 4.50; N, 10.08.

*Example 3*

Following the procedure of the preceding Example 2, substituting for the 2-amino-4-methylphenyl of the example equimolar amounts each of 2-amino-3-methylphenol, 2 - amino - 5 - methylphenol, 2-amino-6-methylphenol, 2 - amino-3-ethylphenol, 2-amino-4-ethylphenol, 2-amino-5-ethylphenol, and 2-amino-6-ethylphenol, there can be respectively obtained 3-(3-indolyl)-5-methyl-2H-1,4-benzoxazin-2-one, 3 - (3 - indolyl) - 7 - methyl-2H-1,4 - benzoxazin - 2 - one, 3 - (3 - indolyl) - 8 - methyl-2H - 1,4 - benzoxazin-2-one, 3-(3-indolyl)-5-ethyl-1,4-benzoxazin - 2 - one, 3 - (3 - indolyl) - 6 - ethyl-2H-1,4-benzoxazin - 2 - one, 3 - (3 - indolyl)-7-ethyl-2H-1,4-benzoxazin - 2 - one, and 3-(3-indolyl)-8-ethyl-2H-1,4-benzoxazin-2-one.

What is claimed is:
1. A compound of the formula

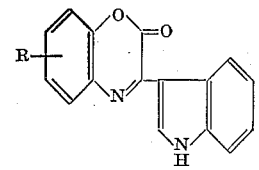

wherein R is a member selected from the group consisting of hydrogen, methyl and ethyl.
2. 3-(3-indolyl)-2H-1,4-benzoxazin-2-one.
3. 3-(3-indolyl)-6-methyl-2H-1,4-benzoxazin-2-one.

References Cited by the Examiner
UNITED STATES PATENTS
3,105,071  9/1963  Moffett _____ 260—244
FOREIGN PATENTS
563,113  12/1957  Belgium.

WALTER A. MODANCE, *Primary Examiner.*
ROBERT T. BOND, *Assistant Examiner.*